US012701154B2

(12) United States Patent
Syal et al.

(10) Patent No.: US 12,701,154 B2
(45) Date of Patent: *Aug. 4, 2026

(54) AUTOMATED DELIVERY OF ALERTS WITH CONFIRMATION OF RECEIPT

(71) Applicant: QUEST DIAGNOSTICS INVESTMENTS INCORPORATED, Wilmington, DE (US)

(72) Inventors: Kamal Syal, Piscataway, NJ (US); David Evans, Westfield, NJ (US)

(73) Assignee: Quest Diagnostics Investments Incorporated, Wilmington, DE (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/911,822

(22) Filed: Jun. 25, 2020

(65) Prior Publication Data

US 2020/0325930 A1 Oct. 15, 2020
US 2021/0396262 A9 Dec. 23, 2021

Related U.S. Application Data

(60) Division of application No. 15/673,797, filed on Aug. 10, 2017, now Pat. No. 10,708,345, which is a continuation of application No. 12/346,190, filed on Dec. 30, 2008, now Pat. No. 9,749,394.

(51) Int. Cl.
*H04L 67/10* (2022.01)
*H04L 51/23* (2022.01)
*H04L 67/50* (2022.01)

(52) U.S. Cl.
CPC .............. *H04L 67/10* (2013.01); *H04L 51/23* (2022.05); *H04L 67/535* (2022.05)

(58) Field of Classification Search
CPC .... F16B 33/008; F16B 35/045; F16B 43/001; H04L 67/10; H04L 67/535
See application file for complete search history.

(56) References Cited

U.S. PATENT DOCUMENTS

| | | | |
|---|---|---|---|
| 6,092,102 A | 7/2000 | Wagner | |
| 6,853,388 B2 | 2/2005 | Ueno et al. | |
| 7,034,691 B1 | 4/2006 | Rapaport et al. | |
| 7,215,803 B2 | 5/2007 | Marshall | |
| 7,436,311 B2 | 10/2008 | Rapaport et al. | |
| 7,475,117 B1 | 1/2009 | Chapman | |
| 7,653,668 B1 | 1/2010 | Shelat et al. | |
| 7,916,014 B2 | 3/2011 | Rapaport et al. | |
| 8,193,931 B2 | 6/2012 | Rapaport et al. | |

(Continued)

*Primary Examiner* — Hua Fan
(74) *Attorney, Agent, or Firm* — Haug Partners LLP; Jon E. Gordon

(57) ABSTRACT

Systems and methods are provided for delivering information as alerts. Alerts may be sent to one or more destinations at one or more times, with possible destinations including, e.g., one or more dedicated software clients, portable wireless devices, and/or email accounts, among many other possibilities. The sender may receive confirmation of, and/or may keep persistent records of, among several possibilities, transmission of one or more of the alerts, receipt of one or more of the alerts by devices at their respective destinations, and/or presentation of the alert to the intended recipient. According to an embodiment of the invention, an alert may be used to delivery medical information, which may include an urgent result of a medical test that has been performed on a patient.

21 Claims, 5 Drawing Sheets

(56) References Cited

U.S. PATENT DOCUMENTS

| | | | |
|---|---|---|---|
| 8,533,612 | B2 | 9/2013 | Hochendoner et al. |
| 8,615,413 | B2 | 12/2013 | McKee et al. |
| 8,711,396 | B2 | 4/2014 | Tian |
| 2002/0019852 | A1 | 2/2002 | Bahar |
| 2002/0024535 | A1 | 2/2002 | Ueno et al. |
| 2002/0165986 | A1 | 11/2002 | Tarnoff |
| 2002/0169854 | A1 | 11/2002 | Tarnoff |
| 2002/0169865 | A1 | 11/2002 | Tarnoff |
| 2003/0172127 | A1 | 9/2003 | Northrup et al. |
| 2004/0143661 | A1 | 7/2004 | Higashi et al. |
| 2004/0172298 | A1 | 9/2004 | Cross |
| 2005/0144222 | A1 | 6/2005 | Marshall |
| 2006/0047762 | A1 | 3/2006 | Su |
| 2006/0161457 | A1 | 7/2006 | Rapaport et al. |
| 2008/0103720 | A1* | 5/2008 | White .................... G16H 80/00 |
| | | | 702/127 |
| 2009/0055220 | A1 | 2/2009 | Rapaport et al. |
| 2010/0117799 | A1 | 5/2010 | Dormer et al. |
| 2010/0313148 | A1 | 12/2010 | Hochendoner et al. |
| 2011/0047092 | A1 | 2/2011 | Taylor |
| 2011/0238435 | A1 | 9/2011 | Rapaport et al. |
| 2012/0041783 | A1 | 2/2012 | McKee et al. |
| 2014/0089010 | A1 | 3/2014 | McKee et al. |
| 2014/0278461 | A1 | 9/2014 | Artz |

* cited by examiner

200

Establish Relationship ——205

Register for Alerts ——210

Install Client Software ——215

Register Clients with Server ——220

AUTOMATED DELIVERY OF ALERTS WITH CONFIRMATION OF RECEIPT

CROSS-REFERENCE TO RELATED APPLICATION

This application is a divisional of U.S. patent application Ser. No. 15/673,797, filed 10 Aug. 2017 and titled "Automatic Delivery of Alerts with Confirmation of Receipt", which is a continuation of U.S. patent application Ser. No. 12/346,190, now U.S. Pat. No. 9,749,394, filed 30 Dec. 2008 and titled "Automatic Delivery of Alerts with Confirmation of Receipt"; both applications are incorporated herein by reference.

This application contains material relating to medical services and medical information. The provision and handling of some medical services and medical information are regulated, as for example, by the United States Government, the various state governments, and other governmental agencies within the United States and elsewhere. The disclosure herein is made solely in terms of logical and financial possibility and advantage, without regard to possible statutory, regulatory, or other legal considerations. Nothing herein is intended as a statement or representation of any kind that any method or process proposed or discussed herein does or does not comply with any statute, law, regulation, or other legal requirement whatsoever, in any jurisdiction; nor should it be taken or construed as doing so.

BACKGROUND

Delivery of certain information may be urgent. For example, the result of a medical test performed in a laboratory may indicate the possible existence of a life-threatening medical condition. Laws, regulations, and/or established procedures may specify that such results are to be delivered promptly.

Such procedures may involve, for example, attempting to contact the physician who ordered the test so that the results may be delivered personally. Finding the physician so that the result may be delivered, however, may be burdensome, especially given the multiple and proliferating ways to reach any individual. The multiple diverse means of communication also complicate ensuring that any urgent result has been delivered and/or seen by the intended recipient.

BRIEF SUMMARY OF THE INVENTION

The invention relates to delivering information and automatically recording delivery thereof. More specifically, it relates to delivery of information, such as the results of medical tests, in the form of electronic alerts. Delivery of an alert according to an embodiment of the invention may be recorded automatically. Confirmation may also be received that the intended recipient has received the alert, and such confirmation may also be recorded automatically.

According to an embodiment of the invention, a method is provided of transmitting an urgent alert from a computer system that comprises at least one processor, at least one network interface operatively coupled to at least one of the processors, and a computer-readable storage medium operatively coupled to at least one of the processors. The method comprises transmitting through at least one of the network interfaces, to a client, first information that comprises an alert. The method also comprises receiving through at least one of the network interfaces second information indicating that the client has presented the alert at a first time and, in response to receiving the second information, storing in the computer-readable storage medium a record that the first information was presented, the record comprising the first time.

In an embodiment of the invention, the method comprises receiving through at least one of the network interfaces third information indicating that the client has received input from a user at a second time acknowledging receipt of the presented alert and, in response to receiving the third information, storing in the computer-readable storage medium a record of the input from the user, the record comprising the second time.

In an embodiment of the invention, the method comprises waiting a predetermined time, during which no information is received through any of the network interfaces indicating that the client has received input from a user acknowledging receipt of the presented alert. The method also comprises, after the predetermined time has passed, transmitting through at least one of the network interfaces third information indicating that the alert has not been acknowledged within the predetermined time.

In an embodiment of the invention, the alert according to the method comprises an indication that a result of a laboratory test performed upon a patient has become available. In a further embodiment of the invention, the alert comprises indication that the result of the laboratory test is outside of a reference range.

Embodiments of the invention also include computer systems including programming to carry out the methods described above and computer-readable media encoded with instructions that, when executed by one or more processors within a computer system, cause the computer system to carry out the methods described above.

BRIEF DESCRIPTION OF THE DRAWINGS

The invention is illustrated in the figures of the accompanying drawings, which are meant to be exemplary and not limiting, and in which like references are intended to refer to like or corresponding things.

DETAILED DESCRIPTION OF THE PREFERRED EMBODIMENTS

Figure 1:
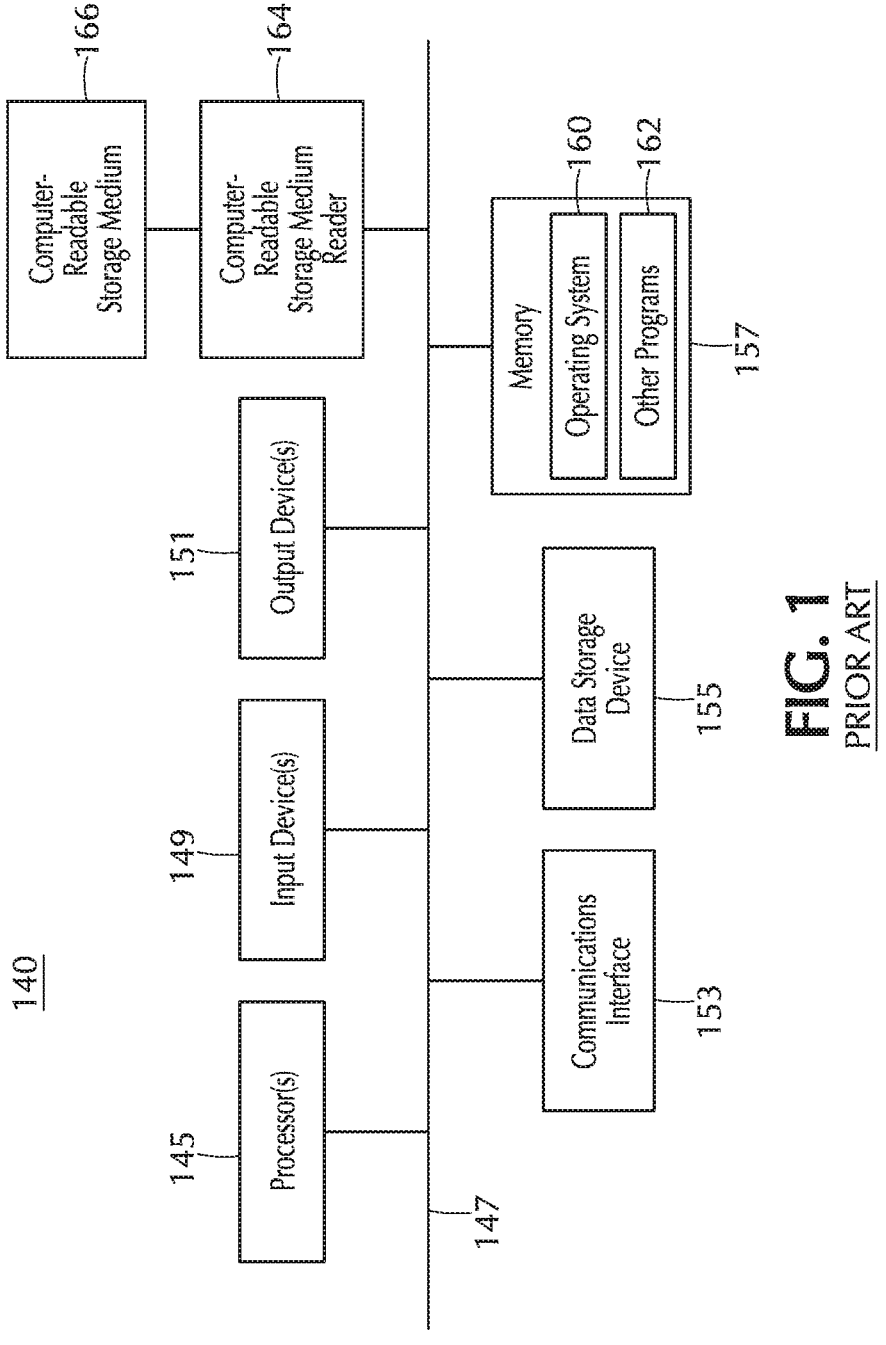
FIG. 1 is a block diagram depicting a programmable digital computer according to the prior art.

The invention disclosed herein relates to automated processes for delivering information. Although of general utility, the invention may be described or illustrated herein in terms of applications that involve laboratory testing, especially in relation to the practice of medicine. The invention is not limited to such applications, however, and no such limitation is intended or implied.

Medical practice may involve laboratory testing, e.g., to diagnose and/or monitor one or more health conditions of a patient. For example, a sample, comprising, e.g., body fluids, cells, or tissues, may be collected. Once collected, the sample may be subjected to one or more assays, which may measure the absolute or relative level or amount of a substance or constituent in the sample. (The substance or constituent measured in the assay may be referred to as an "analyte.")

Although some assays may take place, e.g., in a physician's office, samples are commonly delivered to a testing facility, where the assays take place. Some businesses specialize in providing laboratory testing services. Additionally, some hospitals or medical practices operate their own laboratories, and, depending on circumstances, may provide testing services to outside physicians. The word "laboratory" is used in a broad sense herein, and, unless the context requires otherwise, includes both the facility where an assay takes place and the entity that operates such a facility.

When a physician does not perform an assay personally, e.g., when a laboratory performs the assay, the results of the assay (which may also be referred to as the results of the test) may be given to a physician, possibly the one who ordered the test. The result may be reported, e.g., orally, such as by telephone, or in written or printed form, such as a printed or electronic report. The report may include, e.g., information such as the identity of the patient, the date, time, and/or location at which a sample was collected, the one or more tests and/or panels of tests performed, and values for one or more analytes.

A medical test may be performed, e.g., to diagnose (or rule out) or monitor one or more medical conditions. An abnormal test result may indicate that a patient has or may have a particular condition. It is therefore in some cases useful to establish ranges of analyte values that are likely to be found in healthy persons.

A "reference range" may be established for an analyte, and the reference range may be intended, e.g., to contain the range of values for the analyte that are expected for most tests performed in healthy people. A reference range most commonly establishes a guideline, but it may not be expected to definitively identify disease: a healthy person may have a value for an analyte that is outside of the corresponding reference range, and a person may have a medical condition even though an analyte commonly indicative of that condition is inside the reference range.

One basis for establishing reference ranges, for example, applies to analytes that may be expected to have values that, in a healthy population, obey a normal distribution. For such analytes, reference ranges may be defined so that, for any analyte, 95% (or two standard deviations) of the healthy population will have values within that range. By definition, for such ranges, 5% of the healthy population will have values for any analyte that are outside of the reference range for that analyte.

Depending on circumstances, reference ranges applicable to any particular test may be established, e.g., by the laboratory, by one or more medical practices, or by legal authority, such as by regulations issued by one or more authorities. When providing a test result, a laboratory may include any applicable reference range, e.g., by printing the values defining the reference range next to the value of the corresponding analyte. When a value for an analyte is outside of the reference range, the report may also indicate this fact, e.g., by printing the value, the name of the analyte, and/or the reference range in boldface type.

Besides establishing reference ranges for one or more analytes, as described above, a laboratory, medical practice, legal authority, or other source may establish guidelines for analyte values that may indicate that a patient has a life-threatening condition and may require immediate attention. A result indicating such an analyte value may be referred to herein as a "critical result." Although not every value that is outside a reference range will be considered critical, critical results may be expected in most cases to be outside the applicable reference range. In some cases, a reference range may not even exist: for some toxic substances, such as methanol, for example, any value other than zero may be considered critical.

Additionally, reference ranges and threshold values for critical results may vary, e.g., depending on the population to which the patient belongs. For example, in some cases, different values may apply to infants, children, and adults.

Some tests may be considered "critical tests," which may mean, for example, that the result of the test may be considered a critical result, no matter what the value. For example, a Gram stain of a bacterial sample may be necessary to select the antibiotic used to treat a life-threatening infection. In some cases, a physician may indicate when ordering the test that the test is critical.

Laboratories may establish policies for reporting critical tests. For example, a laboratory may require that, within twenty minutes of obtaining a critical result, that result must be delivered and a confirmation of delivery must be received directly from the ordering physician. Such policies may be the result of one or more initiatives taken by the laboratory and/or may be required by one or more legal and/or regulatory authorities, standards-setting organizations, or other authorities. To document compliance with applicable policies and/or regulations, a laboratory may record each step taken in attempting to deliver a critical result to the physician as well as the confirmation from the physician that the result was delivered.

Besides critical results, other test results may be designated for expedited delivery, e.g., in response to a request from the ordering physician. A laboratory may treat a test accompanied by such a request as it treats a critical test or it may treat such a test differently. One or more classes of expedited handling may be created, depending on the laboratory and/or circumstances.

Delivery of information according to an embodiment of the invention, including, e.g., results of medical tests, may be practiced using programmable digital computers. FIG. 1 is a block diagram of a representative prior art computer. The computer system 140 includes at least one processor 145, such as, e.g., an Intel Core™ 2 microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network (not depicted) such as the Internet.

Although the computer system 140 is shown in FIG. 1 to have only a single communications channel 147, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 147 may interoperate, and may thereby be considered to be coupled to one another, despite being directly connected to different communications channels.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store instructions executable by one or more processors 145 or kinds of processors, data, or both. Some groups of instructions, possibly grouped with data, may make up one or more programs, which may include an operating system 160 such as Microsoft Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C #, Visual Basic®, VB.NET®, Perl, Ruby, Python, or other programming languages, possibly using object oriented design and/or coding techniques.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Alternatively, one or more CRSM readers may be coupled to the rest of the computer system 140, e.g., through a network interface (not depicted) or a communications interface 153. In any such configuration, however, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Figure 2:
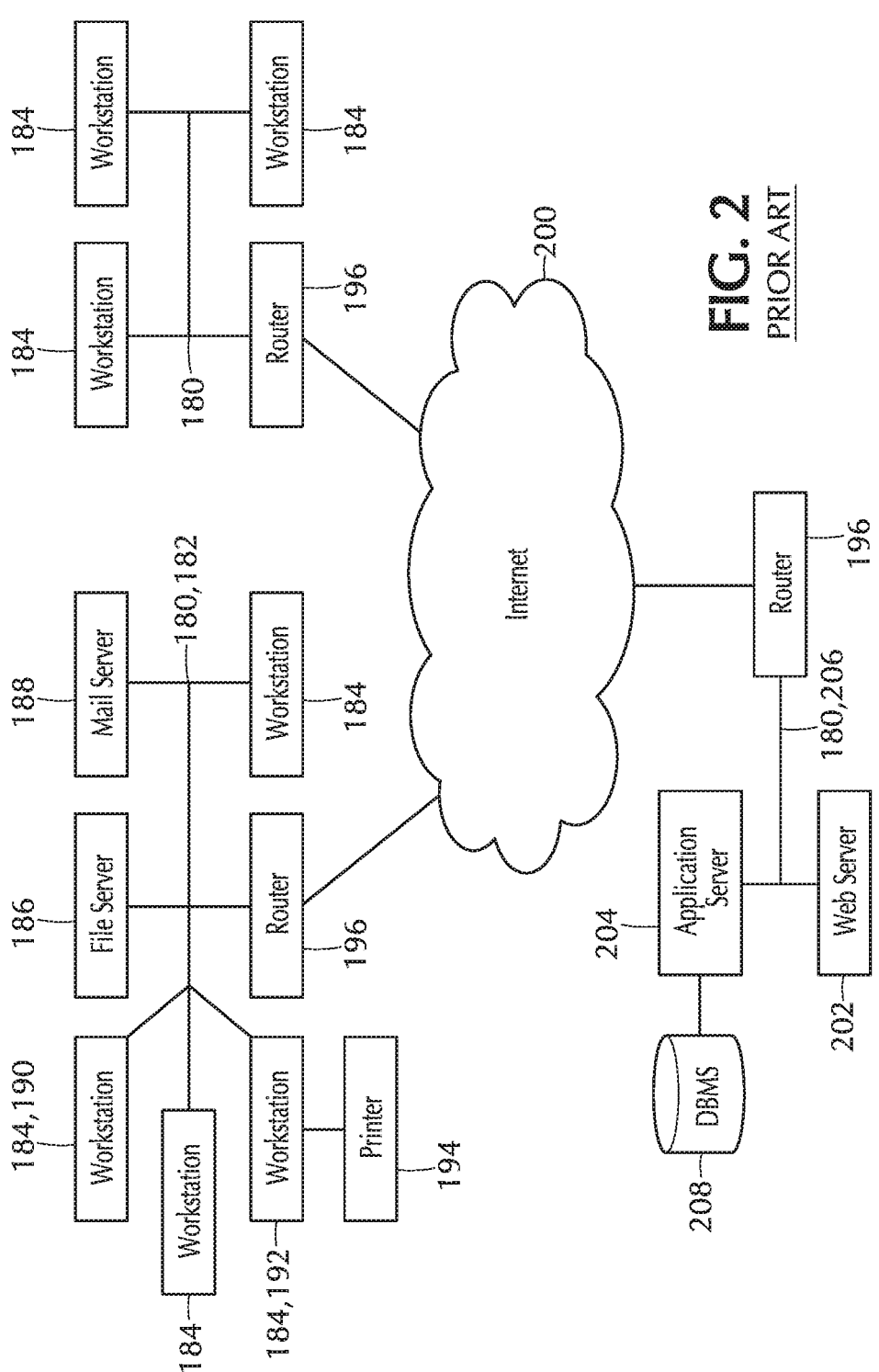
FIG. 2 is a block diagram depicting internetworked computer systems according to the prior art.

Two or more computer systems 140 may be connected, e.g., in one or more networks, via, e.g., their respective communications interfaces 155 and/or network interfaces (not depicted). FIG. 2 is a block diagram of representative prior art interconnected networks 180, such as may be useful in connection with embodiments of the invention.

A network 182 may, for example, connect one or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

Further, a computer system may simultaneously act as a workstation, a server, and/or a client. For example, as depicted in FIG. 2, a workstation 192 is connected to a printer 194. That workstation 192 may allow users of other workstations on the network 182 to use the printer 194, thereby acting as a print server. At the same time, however, a user may be working at the workstation 192 on a document that is stored on the file server 186.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196.

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network 206 or a different one and/or a Database Management System ("DBMS") 208.

The terms "client" and "server" may describe programs and running processes instead of or in addition to their application to computer systems described above. Generally, a (software) client may consume information and/or computational services provided by a (software) server.

A client and server, in this sense, may be in the same or different computer systems, depending on the implementation of the software and/or the users' needs, among many possible considerations. When the client and server are in separate computer systems, they may communicate, e.g., by using one or more facilities provided by one or more operating systems and/or other programs to send and receive data through one or more networks 180 that connect the computer systems.

The term "server" may be used without qualification, e.g., to refer to a computer system that provides a service, as described above, or to refer to one or more programs and/or processes in such a system, by virtue of which the computer system provides such a service. In some circumstances, the term "server" may, in a single discussion, refer at one time to a computer system and at another time to software in the computer system, with the precise meaning supplied by context. The term "client" may be similarly used in either or both senses of the term.

According to embodiments of the invention, networked computer systems, e.g., as described above, are used to deliver information. In an embodiment of the invention, a confirmation may be recorded, e.g., by a server, that information was delivered, e.g., from the server to a client. A second confirmation may be recorded separately, e.g., by the server, that a person received the information from the client.

For example, an embodiment of the invention may relate to the provision of medical tests by a laboratory. In such an embodiment, a server may send information, e.g., the results of one or more tests, to a client used by, e.g., the physician who ordered the test. In response to receiving the information, the client may both send a confirmation of receipt, e.g., to the server from which the information was received, and cause the information to be presented, e.g., in the form of an alert window within a graphical user interface on an electronic display device that is coupled to the client computer system.

Figure 3:
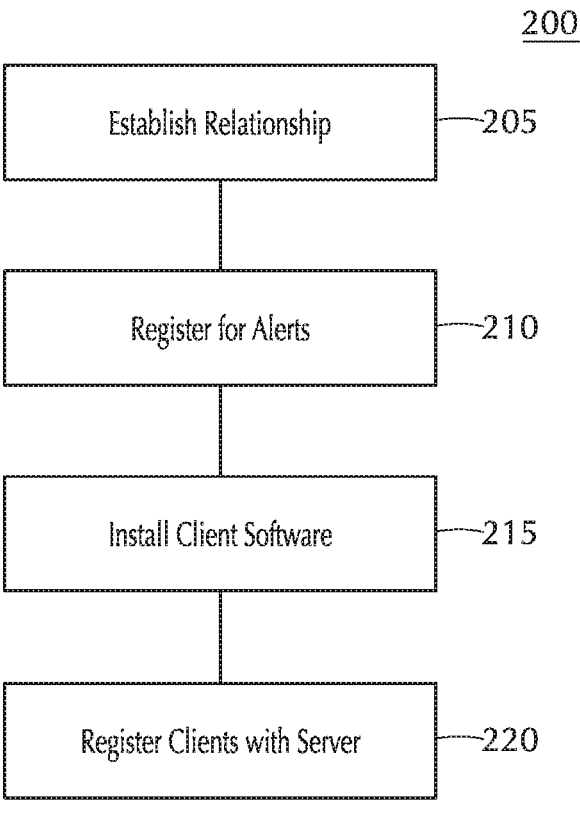
FIG. 3 depicts a workflow in which a physician may register to receive alerts according to an embodiment of the invention.

FIG. 3 depicts a workflow 200 in which a physician may register to use a service that provides alerts for test results, in connection with an embodiment of the invention. The workflow 200 begins in block 205, in which the physician establishes a business relationship with a laboratory, e.g., by opening an account. The activities comprised by establishing the relationship 205 according to an embodiment of the invention may vary, depending, e.g., on circumstances such as the laboratory's internal procedures and legal (including statutory and/or regulatory) and/or insurance requirements.

For example, in connection with an embodiment of the invention, creating the relationship 205 may include confirming that the physician is permitted to order medical tests under the applicable legal and/or regulatory regime and/or arranging for financial responsibility for any ordered tests. Establishing such a relationship 205 may include, e.g., one or more personal and/or telephonic contacts between a physician and one or more representatives of a laboratory and/or the transfer of one or more relevant documents. In some circumstances, if a physician is associated with a medical practice, the medical practice may establish the relationship with the laboratory, and the physician may take advantage of that relationship. In addition to or instead of the foregoing, if a physician is associated with a medical practice, one or more other persons associated with the medical practice may perform one or more actions on behalf to the physician to establish the relationship between the physician and the laboratory.

Block 210 represents a physician's registration to use an alert service associated with a laboratory according to an embodiment of the invention. The precise contents of this step may depend, e.g., on the embodiment of the invention and details of the implementation. But it will be appreciated by those skilled in the relevant arts that registration may include, for example, a request from, or consent by, the physician to receive alerts electronically.

In block 215, client software is installed on one or more computers, which may be situated so that the physician may be able to receive alerts through them.

In block 220, the service is configured, e.g., by the physician, to transmit alerts to one or more clients according to an embodiment of the invention. It will be appreciated that configuration 220 may vary substantially depending upon the implementation of the system. But it will be further appreciated that configuration 220 may include directing, e.g., a server to send alerts associated with one or more physicians and/or accounts to one or more destinations, which may include, e.g., one or more installed instances of client software according to an embodiment of the invention.

According to one embodiment of the invention, for example, configuration 220 may include launching the client software and using the client to enter information about the physician's account with the laboratory. Such information may in an embodiment of the invention be stored, e.g., persistently within the client computer, and the client software may be configured to automatically contact a server associated with the laboratory and use some or all of the entered information and/or other information to register itself as a destination for alerts. The communication between the client and the server may in an embodiment of the invention cause information to be stored persistently by the client, the server, or both.

Such configuration may be obtained by the software, e.g., during installation of the client software, in addition to or instead of by running the client software directly.

In an embodiment of the invention, configuration 220 may include other use of computer networks, such as the Internet, in addition to or instead of that described above. For example, the World Wide Web may be used to specify one or more destinations for alerts according to an embodiment of the invention. A Web form, for example, may allow a user to specify one or more destinations for alerts, including, e.g., one or more instances of client software, such as described herein. Other possible destinations for alerts may include, without limitation, one or more email accounts, pagers, voice mailboxes, telephone numbers, SMS accounts and/or other synchronous and/or asynchronous means of communication.

According to an embodiment of the invention, configuration may include, e.g., specifying groups of one or more such destinations and/or ordering destinations and/or groups in a sequence for receipt of alerts. For example, a user may specify that an attempt is first to be made to deliver an alert to a particular installed client. If that attempt fails, or confirmation of receipt of the delivered alert is not received within a specified time, a second attempt is to made to deliver the alert to one or more other installed clients and/or email accounts. Depending on the embodiment of the invention, three or more levels of destinations may be specified.

According to an embodiment of the invention, the last level of destinations may include one or more telephone numbers, e.g., that may be used to contact the physician directly, so that a person may deliver the results personally when automatic delivery cannot be confirmed. In such an embodiment, configuration 220 may include providing one or more such telephone numbers.

Figure 4:
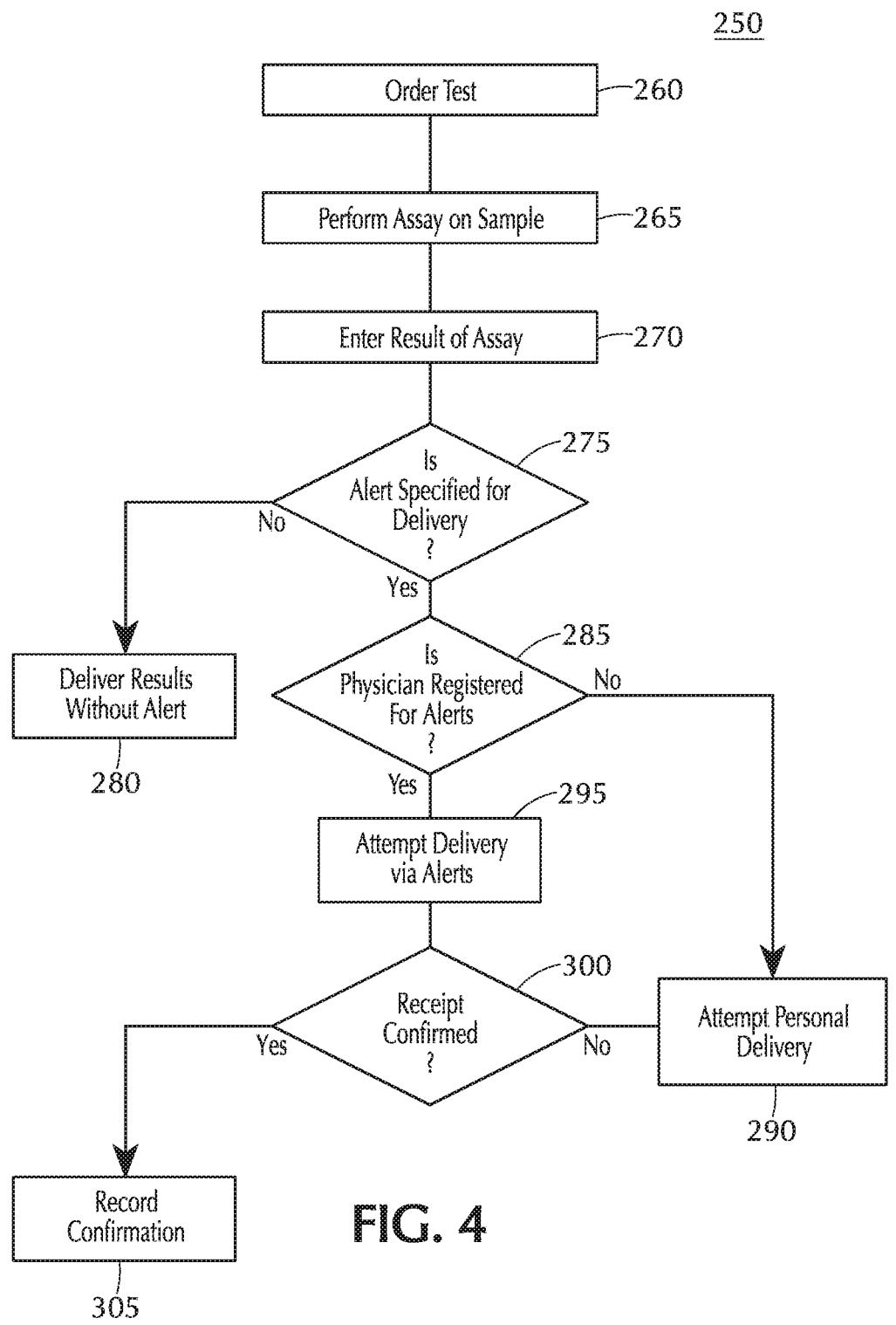
FIG. 4 depicts a workflow in which an alert may be sent according to an embodiment of the invention.

FIG. 4 depicts a workflow 250 for generating alerts according to an embodiment of the invention. In connection with this discussion of the workflow 250 depicted in FIG. 4, it is assumed that the physician already has some kind of relationship, e.g., an account with a provider of laboratory services, such as may result from the workflow 200 of FIG. 3.

In the depicted embodiment of the invention, the workflow begins in block 260, when the physician orders a laboratory test for a patient. Ordering a test in connection with an embodiment of the invention may include, e.g., completing a requisition, which may include supplying information electronically or on a paper form. Information on a requisition may include, for example, information identifying and/or otherwise associated with the patient, a specification of one or more tests to be performed, information identifying and/or otherwise associated with the physician, and/or other information. A requisition may also provide for designating one or more tests as critical or otherwise requesting special handling of the test and/or results.

The completed requisition may then be transmitted, e.g., physically or electronically to the laboratory. The requisition may also be accompanied by one or more samples of biological material, such as, for example, body fluids and/or tissues obtained from the patient. Alternatively, the sample may be obtained, e.g., by the laboratory at a facility for collection of such material.

In block 265, an assay is performed upon the sample, resulting in a result that comprises at least one value for at least one analyte. This result is recorded, e.g., electronically, in block 270 according to an embodiment of the invention. Recording may include, e.g., manual entry of one or more values for one or more analytes and/or automatic acquisition of one or more such values from laboratory apparatus.

Block 275 represents determining whether a result is one that may be delivered in connection with one or more alerts in an embodiment of the invention. For example, in an embodiment of the invention, alerts may be a preferred means for delivery of all critical results (which may include all results of critical tests). Other results may be eligible for delivery of results via alerts, including, for example, when the ordering physician requests such delivery. If the result is not one that may be delivered by alert, then the result is delivered by other means, such as those known to the prior art, in block 280.

If a result is eligible to be delivered by an alert, in an embodiment of the invention, it is determined in block 285 whether the physician is registered to receive alerts. If not, then the result may be transmitted elsewhere for personal delivery to the physician in block 290. For example, if a physician is not registered to receive a critical result as an alert according to an embodiment of the invention, a computer system handling the result may transmit the result and/or other information associated with the test, the patient, or both, to another computer system associated with a call center. A representative of the laboratory may then attempt to contact the physician at one or more telephone numbers to deliver the result, and possibly to obtain confirmation that the result has been delivered.

If the physician may accept results as alerts, one or more alerts are transmitted in block 295. In an embodiment of the invention, a server attempts to transmit the alert, e.g., to one or more clients via one or more networks and/or direct connections between computer systems. According to an embodiment of the invention, alerts may be transmitted to some or all other destinations, such as those registered in block 220 of FIG. 3.

In an implementation of the invention, an alert may be transmitted simultaneously (or effectively so) to multiple destinations and/or via multiple channels. For example, an alert may be transmitted to one or more software clients within one or more computer systems, while at the same time being transmitted to one or more email accounts and/or text messaging (e.g., SMS) devices. It will be appreciated that a computer system using only a single interface and/or other shared resource may, in an implementation of the invention, not be able to be transmitting more than one alert at any instant, but that alerts may be, e.g., queued in rapid (or even immediate) succession for transmission and then transmitted individually as resources for transmission become available; such alerts may be considered effectively to have been transmitted simultaneously.

In an embodiment of the invention a client capable of receiving alerts is executing, e.g., as a background application on a computer system used by or otherwise associated with the physician who ordered the test. It will be appreciated that, depending on the embodiment of the invention, the client may receive information from the server according to any of several methods, including without limitation, periodically polling a server and/or by listening for a network connection initiated by the server.

Figure 5:
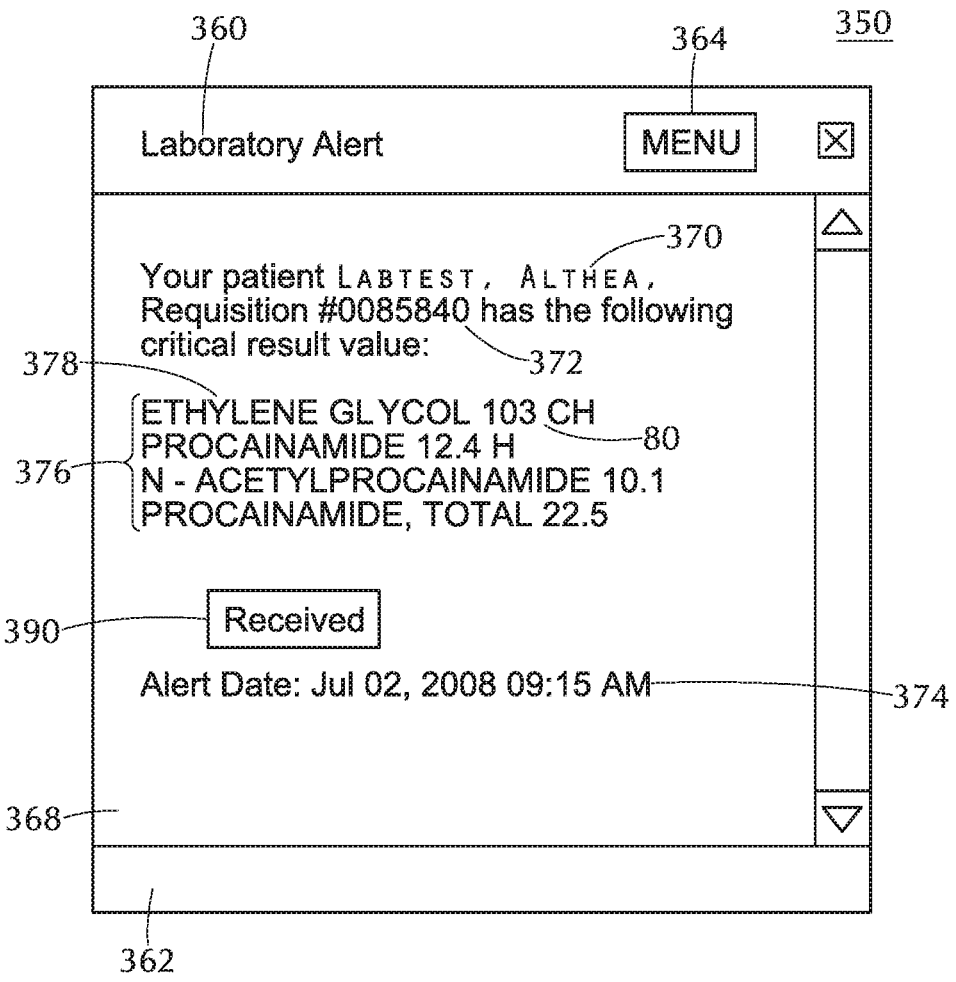
FIG. 5 depicts in schematic form a window presenting an alert according to an embodiment of the invention.

Upon receiving an alert, the client may cause to be presented, e.g., by displaying a window such as FIG. 5 depicts, information from and/or associated with the alert. In an embodiment of the invention, the client may cause the computer system to act to bring the alert to a user's attention, e.g., by prominently displaying the alert window, producing one or more sounds, and/or presenting, modifying, hiding, or removing one or more user interface elements.

In an embodiment of the invention, the content of the alert transmitted in block 295 (FIG. 4) may include information that, e.g., identifies the patient and/or the test and includes one or more values for one or more analytes. An alert may in an embodiment of the invention include one or more reasons for delivery of the result as an alert, such as, e.g., the inclusion of a critical result or the ordering physician's request for such delivery.

In an embodiment of the invention, some or all information in the alert may be encrypted in transit, e.g., by the server, and decrypted, e.g., on receipt by the client. In an embodiment of the invention, the alert may omit some or all specific information associated with, e.g., the test, the patient, and/or the result, and, in an embodiment of the invention, the alert may direct the recipient to contact a representative of the laboratory, e.g., at a call center as described above, to obtain the omitted information.

In an embodiment of the invention, transmission of one or more alerts in block 295 includes recording the transmissions, separately or as a group, e.g., in a database. One or more clients may confirm receipt of the alert by transmitting information, e.g., back to the originating server, and, according to an embodiment of the invention, any such confirmation may be recorded in a database. Confirmation of receipt is not limited to client software installed, e.g., as described above in connection with block 215 of FIG. 3, but may come from any system capable of acknowledging receipt. For example, an SMTP server may confirm that it has successfully received an email message, which, in connection with an embodiment of the invention, may include an alert.

In an embodiment of the invention, confirmation may be obtained that the results have been presented to, e.g., the ordering physician, and such confirmation may be separate from the confirmation that the alert was received, e.g., by a client or other system. For example, a client running on a computer system may receive an alert transmitted from a laboratory server through the Internet. In response to receiving the alert, the client may present, e.g., an alert window on an electronic display device and may indicate, e.g., by conventional user interface elements, that the user may dismiss the alert by providing appropriate input, e.g., through a pointing device. On receiving such input, in an embodiment of the invention, the client may transmit, e.g., to the server, confirmation that the user has dismissed the alert in response to its presentation, and the transmission may be automatic, i.e., occurring without further input or other intervention by the user.

In an embodiment of the invention, confirmation that results have been presented, e.g., to the ordering physician may be entered manually and/or electronically, e.g., by a representative of the laboratory upon receipt by the laboratory of a telephone call or other communication from the physician, requesting results of the test. Such confirmation may be obtained, e.g., in response to an alert that contains only limited information, such as described above. In connection with an embodiment of the invention, the representative may require additional information or interaction from the physician before entering confirmation of presentation to the physician. For example, the representative may request that the physician repeat the presented results to confirm correct receipt.

Block 300 of FIG. 4 represents determining that confirmation of presentation has been received within a specified time period, according to an embodiment of the invention. For example, in an embodiment of the invention, confirmation of presentation must be received, if at all, within twenty minutes of the result having become available. On receipt, confirmation of the presentation of the results may in an embodiment of the invention be stored in a database in block 305.

If confirmation is not received in the specified time, then, in an embodiment of the invention, the result is transmitted elsewhere in block 290 for alternate delivery, as described above.

FIG. 5 depicts an window 350 that presents an alert according to an embodiment of the invention. The window 350 may be presented, e.g., within a graphical user interface presented on an electronic display device that is connected to a computer system. One or more input devices (not pictured), such as, for example, a keyboard and/or a pointing device such as a mouse, may be used to identify and/or select items within the displayed window and/or otherwise to provide information to the computer system.

As depicted in FIG. 5, the alert window 350 includes a caption and/or title, such as "Laboratory Alert." In an embodiment of the invention, the window may be branded, e.g., with the name of the application, the alert service, and/or the name of a laboratory. In the depicted embodiment of the invention, a second area 362 at the bottom of the window is provided within which other information may be provided, including but not limited to, for example, branding information, advertising, news, and/or information associated with one or more drugs, tests, results, and/or patients.

The window 350 in the depicted embodiment of the invention also includes a drop-down menu 364. When the item labeled "MENU" 364 is selected, a menu (not pictured) drops down and presents the user with one or more options. The available options will depend upon the implementation, but may in an embodiment of the invention include, for example, program settings and/or configuration. In an embodiment of the invention, the client application may also be represented, e.g., by an icon in a dock or system tray, and selecting the icon may cause the same menu or a similar one to be presented in association with the icon, even when the alert window 350 is not displayed.

The alert window 350 includes a content area 368 where, in an embodiment of the invention, the content of the alert is presented. The content area 368, as depicted, may include information that identifies the patient 370, the test requisition number 372, and a time and date stamp 374 that may indicate when the alert was transmitted or received. In the depicted embodiment of the invention, the content area 368 may also include one or more results 376, with each result including the name 378 of an analyte and the value 380 measured in the assay.

In the depicted embodiment of the invention, the content area 368 includes a confirmation button 390 labeled "Received." In an embodiment of the invention, the user may confirm receipt of the alert by selecting the confirmation button 390. Selecting the confirmation button 390 may in an embodiment of the invention cause confirmation of presentation to be sent, e.g., as described above.

Selecting the confirmation button 390 may in an embodiment of the invention cause the alert window 350 to be concealed, e.g., by minimizing and/or hiding the alert window 350.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

We claim:

1. A method of transmitting an alert from a computer system participating in a data network with a plurality of clients and configured to communicate via the data network with a plurality of destinations, the computer system comprising at least one processor, a memory operatively coupled to at least one of the processors, and a computer-readable storage medium operatively coupled to at least one of the processors, the method comprising:

storing information that associates a recipient individually with at least a first destination, a second destination, and a third destination, the recipient being an entity, the first destination being a first client, and the third destination not being a client;

transmitting via the data network, to the first destination, first information that comprises an alert;

effectively simultaneously with transmitting the first information to the first client, transmitting to the second destination second information that comprises the alert;

receiving via the data network third information indicating that the first client has executed instructions to cause the first client to present the alert visually, on an electronic display directly coupled to the first client, at a first time, wherein the third information includes the first time and does not indicate whether the first client has received user input acknowledging receipt of the alert; and in response to receiving the third information, storing in the computer-readable storage medium a record that the first information was presented by the first client, the record comprising the first time.

2. The method of claim 1, comprising:

waiting a predetermined time, immediately following transmission of the first information, during which no information is received indicating acknowledgement by the recipient of receipt of the alert from at least one of the first destination and the second destination; and consequent to elapsing of the predetermined time, transmitting via the data network, to a destination that is neither the first destination nor the second destination, fourth information associated with the alert.

3. The method of claim 2, wherein the fourth information indicates that the alert has not been acknowledged within the predetermined time.

4. The method of claim 2, wherein the destination that is neither the first destination nor the second destination is the third destination.

5. The method of claim 4, wherein the third destination is a computer system associated with a call center.

6. The method of claim 2, wherein the fourth information comprises the alert.

7. The method of claim 2, wherein the destination that is neither the first destination nor the second destination is a computer system associated with a call center.

8. A computer system for transmitting alerts, comprising: one or more processors;
a computer-readable storage medium operatively coupled to at least one of the processors; and
a memory, operatively coupled to at least one of the processors;
wherein the computer system is configured to participate in a data network with a plurality of clients and to communicate via the data network with a plurality of destinations; and
wherein the memory contains instructions that, when executed by at least one of the processors, causes the computer system to carry out a method that comprises:
  storing information that associates a recipient individually with at least a first destination, a second destination, and a third destination, the recipient being an entity, the first destination being a first client, and the third destination not being a client;
  transmitting via the data network, to the first destination, first information that comprises an alert;
  effectively simultaneously with transmitting the first information to the first client, transmitting to the second destination second information that comprises the alert;
  receiving via the data network third information indicating that the first client has executed instructions to cause the first client to present the alert visually, on an electronic display directly coupled to the first client, at a first time, wherein the third information includes the first time and does not indicate whether the first client has received user input acknowledging receipt of the alert; and
  in response to receiving the third information, storing in the computer-readable storage medium a record that the first information was presented by the first client, the record comprising the first time.

9. The computer system of claim 8, wherein the method comprises:
  waiting a predetermined time, immediately following transmission of the first information, during which no information is received indicating acknowledgement by the recipient of receipt of the alert from at least one of the first destination and the second destination; and
  consequent to elapsing of the predetermined time, transmitting via the data network, to a destination that is neither the first destination nor the second destination, fourth information associated with the alert.

10. The computer system of claim 9, wherein the fourth information indicates that the alert has not been acknowledged within the predetermined time.

11. The computer system of claim 9, wherein the destination that is neither the first destination nor the second destination is the third destination.

12. The computer system of claim 11, wherein the third destination is a computer system associated with a call center.

13. The computer system of claim 9, wherein the fourth information comprises the alert.

14. The computer system of claim 9, wherein the destination that is neither the first destination nor the second destination is a computer system associated with a call center.

15. At least one non-transitory computer-readable storage medium encoded with instructions that, when executed by at least one processor comprised by a computer system that participates in a data network with a plurality of clients, is configured to communicate via the data network with a plurality of destinations, and comprises a memory operatively coupled to at least one of the processors, causes the computer system to carry out a method that comprises:
  storing information that associates a recipient individually with at least a first destination, a second destination, and a third destination, the recipient being an entity, the first destination being a first client, and the third destination not being a client;
  transmitting via the data network, to the first destination, first information that comprises an alert;
  effectively simultaneously with transmitting the first information to the first client, transmitting to the second destination second information that comprises the alert;
  receiving via the data network third information indicating that the first client has executed instructions to cause the first client to present the alert visually, on an electronic display directly coupled to the first client, at a first time, wherein the third information includes the first time and does not indicate whether the first client has received user input acknowledging receipt of the alert; and
  in response to receiving the third information, storing in the computer-readable storage medium a record that the first information was presented by the first client, the record comprising the first time.

16. The at least one computer-readable storage medium of claim 15, wherein the method comprises:
  waiting a predetermined time, immediately following transmission of the first information, during which no information is received indicating acknowledgement by the recipient of receipt of the alert from at least one of the first destination and the second destination; and
  consequent to elapsing of the predetermined time, transmitting via the data network, to a destination that is neither the first destination nor the second destination, fourth information associated with the alert.

17. The at least one computer-readable storage medium of claim 16, wherein the fourth information indicates that the alert has not been acknowledged within the predetermined time.

18. The at least one computer-readable storage medium of claim 16, wherein the destination that is neither the first destination nor the second destination is the third destination.

19. The at least one computer-readable storage medium of claim 18, wherein the third destination is a computer system associated with a call center.

20. The at least one computer-readable storage medium of claim 16, wherein the fourth information comprises the alert.

21. The at least one computer-readable storage medium of claim 16, wherein the destination that is neither the first destination nor the second destination is a computer system associated with a call center.

* * * * *